United States Patent
Westra et al.

(10) Patent No.: US 6,779,802 B2
(45) Date of Patent: Aug. 24, 2004

(54) APPLIANCE WITH SEAL BETWEEN TWO HOUSING SHELLS

(75) Inventors: Thewis Minne Westra, Drachten (NL); Ake Jan Siert Van Der Vinne, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/205,557

(22) Filed: Jul. 25, 2002

(65) Prior Publication Data

US 2003/0030232 A1 Feb. 13, 2003

(30) Foreign Application Priority Data

Jul. 30, 2001 (EP) .............................. 01202896

(51) Int. Cl.[7] .............................................. F16J 15/02
(52) U.S. Cl. .................... 277/628; 277/630; 277/637
(58) Field of Search ............................... 277/628, 630, 277/637, 641, 642, 643; 285/419, 373

(56) References Cited

U.S. PATENT DOCUMENTS

| 2,764,311 | A | * | 9/1956 | Blackman | .................. 277/641 |
|---|---|---|---|---|---|
| 2,818,287 | A | * | 12/1957 | Josephson | .................. 277/530 |
| 4,152,096 | A | * | 5/1979 | Murakami et al. | .......... 415/200 |
| 4,192,520 | A | * | 3/1980 | Hasegawa | .................... 277/591 |
| 4,201,306 | A | * | 5/1980 | Dubois et al. | ............. 220/4.05 |
| 5,050,764 | A | * | 9/1991 | Voss | ........................... 220/378 |
| 5,074,428 | A | * | 12/1991 | Wildfeuer | .................... 220/322 |
| 5,335,921 | A | * | 8/1994 | Orlowski | ..................... 277/637 |
| 5,687,975 | A | * | 11/1997 | Inciong | ........................ 277/591 |
| 6,354,601 | B1 | * | 3/2002 | Krampotich et al. | ........ 277/628 |
| 6,450,506 | B1 | * | 9/2002 | Krieg et al. | ................. 277/608 |
| 6,543,788 | B2 | * | 4/2003 | Ito | .............................. 277/630 |
| 6,561,522 | B1 | * | 5/2003 | Radelet et al. | ............... 277/628 |

FOREIGN PATENT DOCUMENTS

| DE | 4439337 A1 | 5/1995 | ............ F21V/3/00 |
|---|---|---|---|
| WO | WO9941531 | 1/1999 | ............ F16J/15/06 |

* cited by examiner

Primary Examiner—William L. Miller

(57) ABSTRACT

Appliance having two housing shells (1,2), each having a circumferential contact rim (3,4) with corresponding wall portions (8,9) and a sealing (5) between the wall portions. Fastening means (6) are provided so as to connect the housing shells in a fastening direction (7). The direction (12) of the sealing force is substantially perpendicular to the direction (7) of the fastening force and independent of the fastening force.

7 Claims, 2 Drawing Sheets

APPLIANCE WITH SEAL BETWEEN TWO HOUSING SHELLS

The invention relates to an appliance having a first and a second housing shell, each shell being provided with a closed circumferential contact rim having a wall portion corresponding with the respective other one, which wall portions in the mounted state of the housing shells are connected to one another with a sealing element interposed therebetween, said sealing element being integral with a wall of the wall portion of the first housing shell, while the housing shells are fastened to one another by fastening means under the influence of a fastening force in a fastening direction with the sealing element interposed therebetween.

To make appliances having two housing shells watertight, seals are often used nowadays which are fastened to a wall portion of the contact rim of one of the housing shells by means of a two-component injection-molding method. The advantage of such seals simultaneously made during injection molding is that separate seals, whose mounting is time-consuming, need no longer be used. An injection-molded seal is already in the correct location, so that assembly can take place quicker. Loose seals have to achieve a good sealing at both housing shells. If the seals are injection-molded, the good sealing to one housing shell is already assured. During mounting, the housing shells are connected to one another by fastening means, for example a screw connection, whereby the seal is achieved at the same time. The sealing force is dependent here on the force with which the housing shells are connected to one another, for example are screwed together. To obtain as good as possible a seal, the housing shells are interconnected as tightly as possible. This often leads to undesirable stresses in the housing shells, especially if the material of the housing shells is a synthetic resin. The sealing must be achieved along the entire contact rim, whereas the fastening is present in a single location only. The risk of deformation of the housing shells, especially in the course of time, is increased thereby, and thus the risk that the sealing will no longer be satisfactory in certain locations.

It is an object of the invention to obtain a sealing of the housing shells which is reliable over a longer period of time in an appliance which has two housing shells.

The appliance according to the invention is for this purpose characterized in that, after mounting of the housing shells, a sealing is created between the sealing element and a wall of the wall portion of the second housing shell wherein the direction of the sealing force is approximately perpendicular to the direction of the fastening force, and the sealing force is substantially independent of the fastening force.

This type of sealing has the result that the seal is fully created after the housing shells have been placed against one another and before the housing shells have been interconnected by the fastening means. The fastening means have no adverse effects on the seal, not even after a long period of time. The dimensional tolerances for the housing shells are less critical than in existing appliances in which the tolerances directly influence the degree of sealing.

Preferably, the sealing element is provided with a pointed projection extending substantially perpendicularly to the fastening direction, seen in cross-section in the unmounted state of the housing shells. The pointed projection of the sealing element ensures as it were that an edge seal arises. When the housing shells are placed against one another, the extremity of the projection of the sealing element, seen in cross-section, is pressed against the opposed wall portion, whereby a better seal is obtained. The pointed projection does not constitute a problem during unmolding because the sealing element is made of a soft material.

An embodiment of the appliance is characterized in that the contact rim of the second housing shell is provided with a groove in which the sealing element abuts against two mutually opposed walls of the groove in the mounted state of the housing shells.

Another embodiment of the appliance is characterized in that the contact rim of the second housing shell is provided with a groove in which one of the walls of the groove abuts against the sealing element and the opposed wall portion of the groove abuts against a wall of the wall portion of the first housing shell in the mounted state of the housing shells. Mounting becomes easier as a result of this because the wall portions, which are made of a harder material, easily slide along each other. A further embodiment thereof is characterized in that the wall portion of the first housing shell is elongate and extends in the fastening direction, while the wall against which the sealing element is fastened extends substantially in the fastening direction. It is possible that the soft material of the sealing element starts stripping off during mounting of the housing shells. The elongate dimension of the wall portion and the fact that the sealing element extends over the entire wall imply that the sealing element is upset in the sealing direction during assembling together of the housing shells and at the same time is elongated in the mounting direction, transverse to the sealing direction. This facilitates the assembly.

A further embodiment is characterized in that the first housing shell is provided with a groove, and one of the walls of said groove is provided with the sealing element, while the wall portion of the second housing shell lies enclosed between the sealing element and the wall of the groove opposed to the sealing element in the mounted state of the housing shells.

The invention will now be explained in more detail below with reference to a few embodiments.

Figure 1:
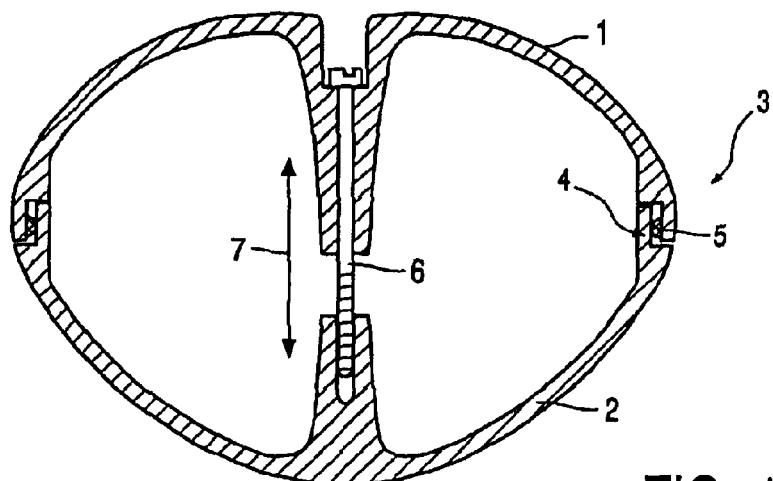
FIG. 1 is a cross-sectional view of two housing shells of an appliance.

FIG. 1 is a cross-sectional view of a sealing arrangement for providing a seal for a housing formed by two synthetic-resin housing shells, i.e. a first housing shell 1 and a second housing shell 2, each having a contact rim 3, 4 which is closed in its circumference, i.e. which forms a continuous, closed rim. The contact rim need not lie in one flat plane, it may alternatively lie in any curved plane. When the housing shells are placed one on the other, the contact rims will show an exact fit. To seal the housing shells, a sealing element 5 which is also circumferentially closed is present between the contact rims 3 and 4. The housing shells are fastened to one another by fastening means 6, for example one screw connection. The direction of the fastening force is indicated with an arrow 7. The direction of the fastening force is approximately the same as the direction in which the housing shells are moved towards one another, i.e. the mounting direction.

Figure 2:
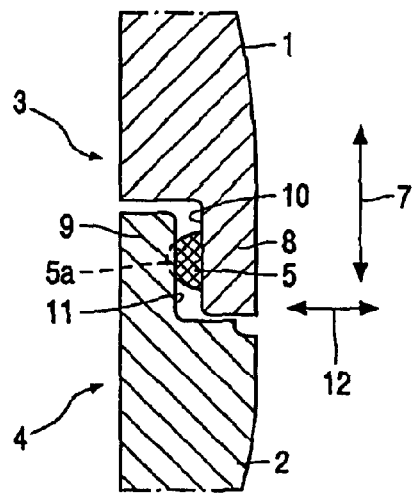
FIGS. 2 to 6 show five examples of the seals of the housing shells of the appliance shown in FIG. 1 in larger-scale cross-sectional views.

FIG. 2 is a detailed view of a first example of the housing shells 1, 2 at the sealing area. The contact rims 3, 4 of the housing shells each have a wall portion 8, 9, which portions correspond to one another and between which portions a sealing element 5 is arranged. The sealing element lies against the wall 10 of the wall portion 8 of the first housing shell 1 and is integral with this wall portion, i.e. it is indetachably connected thereto. This is achieved in a so-called two-component injection-molding process. In a first phase of such an injection-molding process, the housing shell is injection-molded with the use of a comparatively hard material, whereupon in a second phase, with the housing shell still in the mold, the sealing element made of a comparatively soft material is injection-molded against the wall portion so as to form a fixed connection to this wall portion. Viewed in the cross-section of the drawing and in a non-assembled state of the housing shells, the sealing element 5 has the shape of a projection with a somewhat pointed (5*a*) end in a direction transverse to the fastening direction 7. A seal is created between the sealing element 5 and the wall 11 of the wall portion 9 of the second housing shell 2 after the housing shells have been placed one on the other. The direction of the sealing force 12 is approximately perpendicular to the direction of the fastening force 7. This means that the fastening force has no or hardly any influence on the sealing force. In fact, the fastening force exclusively serves to hold the parts together.

Figure 3:
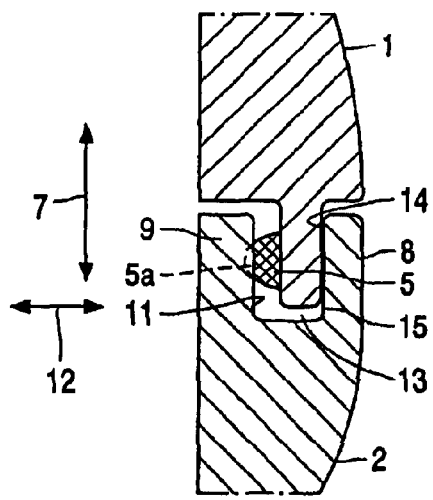

FIG. 3 shows a second example of a seal. The contact rim of the second housing shell 2 is provided with a groove 13, for example a U-shaped groove. When the housing shells 1, 2 are assembled together, the wall portion 8 of the first housing shell 1 with the sealing element 5 is introduced into the groove 13 such that the sealing element 5 will lie against the wall 11 of the groove 13, while the wall 14 of the wall portion 18 facing away from the seal lies against the other wall 15 of the groove 13.

Figure 4:
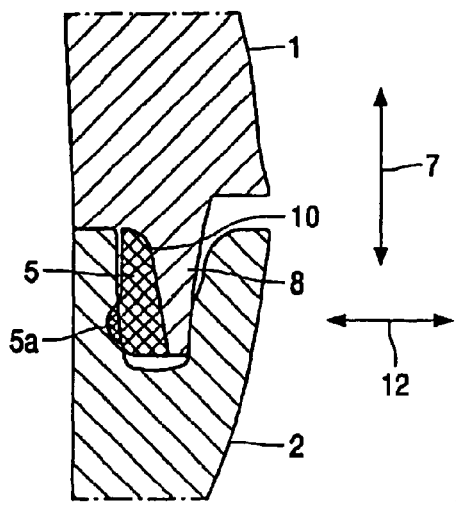

In FIG. 4, the sealing element 5 extends over the full height of the raised wall portion 8. The sealing element accordingly has a more elongate shape. When the housing shells are assembled together, the soft material of the sealing element 5 is upset in the direction of the sealing force 12 and is also somewhat stretched in the longitudinal direction, i.e. the mounting direction 7, which facilitates the mounting process.

Figure 5:
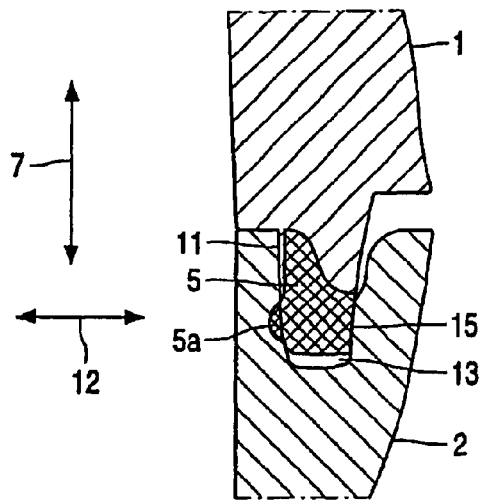

In FIG. 5, the sealing element 5 lies fully enclosed between the mutually opposed walls 11, 15 of the groove 13.

Figure 6:
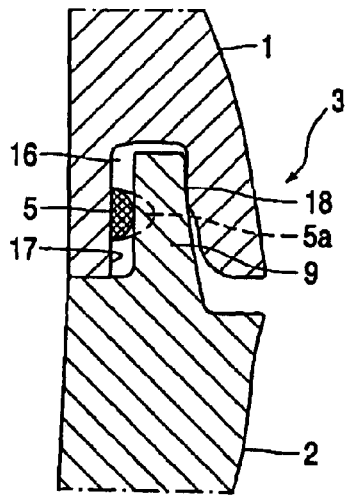

As is shown in FIG. 6, it is also possible to provide the contact rim 3 of the first housing shell 1 with a groove 16 and to integrate the sealing element 5 with one (17) of the two mutually opposed walls 17, 18 of the groove 16.

What is claimed is:

1. A sealing arrangement for providing a seal between a first housing shell (1) and a second housing shell (2) removably attached to said first housing shell (1), each shell comprising two lobes having a substantially cylindrical configuration, each shell being provided with a closed circumferential contact rim (3,4) having a wall portion (8,9), which wall portions (8,9) in the mounted state of the housing shells (1,2) are connected to one another with a sealing element (5) interposed therebetween, said sealing element (5) being integral with an inner wall (10) of the wall portion (8) of the first housing shell (1) and extending substantially perpendicularly therefrom to a fastening direction (7), said sealing element (5) further having a torus shaped protrusion (5*a*) orthogonal to said fastening direction (7) as seen in cross-section in the unmounted state of the housing shells (1,2), the housing shells (1,2) being further fastened to one another by fastening means (6) under the influence of a fastening force in the fastening direction (7) with the sealing element (5) interposed therebetween, wherein a seal is created between the sealing element (5) and an inner wall (11) of the wall portion (9) of the second housing shell (2) while in the mounted state, and wherein the direction (12) of the sealing force is approximately perpendicular to the direction (7) of the fastening force, the sealing force is substantially independent of the fastening force, and the fastening means (6) is centrally located with respect to the seal forming two symmetrically-opposed spaces.

2. A sealing arrangement as claimed in claim 1, characterized in that the contact rim (4) of the second housing shell (2) is provided with a groove (13) in which the sealing element (5) abuts against two mutually opposed walls (11, 15) of the groove (13) in the mounted state of the housing shells.

3. A sealing arrangement as claimed in claim 1, characterized in that the contact rim (4) of the second housing shell (2) is provided with a groove (13th) such that one of the walls (11) of the groove abuts against the sealing element (5) and the opposed wall (15) of the groove abuts against a wall (14) of the wall portion (8) of the first housing shell (1) in the mounted state of the housing shells (1,2).

4. A sealing arrangement as claimed in claim 3, characterized in that the wall portion of the first housing shell (1) is elongate and extends in the fastening direction (7), while the wall (10) against which the sealing element (5) is fastened extends substantially in the fastening direction (7).

5. A sealing arrangement as claimed in claim 1, characterized in that the first housing shell (1) is provided with a groove (16), and one of the walls (17) of said groove is provided with the sealing element (5), while the wall portion (9) of the second housing shell (2) lies enclosed between the sealing element (5) and the wall (18) of the groove opposed to the sealing element in the mounted state of the housing shells (1,2) such that one of the walls of the wall portion (9) of the second housing shell (2) is in abutting engagement with the sealing element (5) and an opposing wall of the wall portion (9) is in abutting engagement with the wall (18) of the groove opposed to the sealing element.

6. A sealing arrangement as claimed in claim 1, wherein said fastening means comprises one connection.

7. A sealing arrangement as claimed in claim 1, wherein said contact rim lies in one of a flat and a curved plane.

* * * * *